(12) United States Patent
Cline

(10) Patent No.: US 11,535,146 B2
(45) Date of Patent: Dec. 27, 2022

(54) BUNK BED/ STORAGE SHED ARRANGEMENT

(71) Applicant: Vincent J. Cline, Elkhart, IN (US)

(72) Inventor: Vincent J. Cline, Elkhart, IN (US)

(*) Notice: Subject to any disclaimer, the term of this patent is extended or adjusted under 35 U.S.C. 154(b) by 0 days.

(21) Appl. No.: 16/974,197

(22) Filed: Nov. 10, 2020

(65) Prior Publication Data

US 2022/0144158 A1    May 12, 2022

(51) Int. Cl.
| | | |
|---|---|---|
| *B60P 3/39* | (2006.01) | |
| *B60N 3/00* | (2006.01) | |
| *B60P 3/34* | (2006.01) | |
| *B60J 5/04* | (2006.01) | |
| *B60R 3/00* | (2006.01) | |

(52) U.S. Cl.
CPC .............. *B60P 3/39* (2013.01); *B60N 3/008* (2013.01); *B60P 3/34* (2013.01); *B60J 5/047* (2013.01); *B60R 3/00* (2013.01)

(58) Field of Classification Search
CPC .............. B60P 3/39; B60P 3/34; B60N 3/008
USPC .......................................... 296/190.02; 5/118
See application file for complete search history.

(56) References Cited

U.S. PATENT DOCUMENTS

| | | | | |
|---|---|---|---|---|
| 157,377 A | * | 12/1874 | Cobb ...................... | B60N 3/008 297/62 |
| 1,945,875 A | * | 2/1934 | Woller ................... | A47C 17/84 292/281 |
| 2,552,691 A | * | 5/1951 | Saunders-Knox-Gore ................. | B60P 3/34 114/65 R |
| 3,353,861 A | * | 11/1967 | Letzel ................ | B62D 33/0612 5/9.1 |
| 3,588,168 A | * | 6/1971 | Froitzheim ........ | B62D 33/0612 5/118 |
| 3,828,374 A | * | 8/1974 | Del Missier ............ | B63B 29/10 5/118 |
| 4,103,373 A | * | 8/1978 | Luedtke ................. | A47C 17/50 5/147 |
| 4,664,438 A | * | 5/1987 | Crepaldi ............ | B62D 33/0612 296/187.05 |
| 4,854,631 A | * | 8/1989 | Laursen .................... | B60P 3/32 296/168 |
| 7,631,374 B2 | * | 12/2009 | Paoutoff ................ | A47C 17/42 5/136 |

(Continued)

FOREIGN PATENT DOCUMENTS

| | | | | |
|---|---|---|---|---|
| CN | 111622584 A | * | 9/2020 | |
| WO | WO-2014062100 A1 | * | 4/2014 | ................ B60P 3/39 |

*Primary Examiner* — Jason S Morrow
*Assistant Examiner* — Wenwei Zhuo
(74) *Attorney, Agent, or Firm* — Ryan M. Fountain

(57) ABSTRACT

A bunk bed apparatus is provided, having at least upper and lower bunks, and which encloses a storage area under the lower bunk when the lower bunk is usable for sleeping, and encloses a larger storage area under the upper bunk when only the upper bunk is usable for sleeping, the lower bunk being moved to form an enclosing wall of the larger storage area. The apparatus can be disposed within a vehicle, such as an RV, adjacent a closable opening to the exterior of the vehicle, which gives full access to both sizes of the storage area. The apparatus can be formed with a slideable end wall which contains a pocket for receiving and storing an access ladder for the upper bunk, and that end wall can form a closable opening for the storage area.

4 Claims, 20 Drawing Sheets

(56) References Cited

U.S. PATENT DOCUMENTS

| | | | | |
|---|---|---|---|---|
| 2001/0030437 | A1* | 10/2001 | Hiebert | B60P 3/34 296/26.01 |
| 2004/0026958 | A1* | 2/2004 | Condino | B60P 3/34 296/156 |
| 2004/0262949 | A1* | 12/2004 | Rasmussen | F16M 13/02 296/61 |
| 2005/0239586 | A1* | 10/2005 | Nebel | A63H 17/05 474/58 |
| 2006/0103154 | A1* | 5/2006 | Berry | B60P 3/32 296/24.39 |
| 2006/0260044 | A1* | 11/2006 | Nebel | A47C 19/20 5/118 |
| 2008/0001427 | A1* | 1/2008 | Day | B60P 3/39 296/156 |
| 2012/0054959 | A1* | 3/2012 | Stimel | B60N 2/7011 5/9.1 |
| 2015/0329035 | A1* | 11/2015 | Johnson | A47C 17/84 5/503.1 |
| 2019/0217752 | A1* | 7/2019 | Johnson | B60N 2/919 |
| 2021/0353072 | A1* | 11/2021 | Aldrich | A47B 83/04 |

* cited by examiner

BUNK BED/ STORAGE SHED ARRANGEMENT

BACKGROUND OF THE INVENTION

The present invention relates generally to structural arrangements for bunk beds for sleeping quarters (or bedrooms) inside a fixed (static) or movable housing structure or living quarters, and for storage areas or integrated storage "sheds" which are accessible from the exterior of a housing structure. More particularly, the present invention relates to bunk bed arrangements within recreational vehicles ("RVs"), such as travel trailers, toy haulers, fifth wheel trailers, motor homes, and like vehicles having at least living quarters therein (and as otherwise defined by the Recreational Vehicle Industry Association). Additional information about RVs can be found on the internet at www.rvia.org.

RVs are typically versatile vehicles which may be used as living quarters when not moving, and (when moving) for concurrently or separately hauling or storing equipment, other vehicles, personal property, people, and animals. RVs are often used for camping and/or recreation, or as temporary living quarters for extended periods of time. As such, RVs can be considered as a mobile housing structure. At the same time or separately, RVs can serve as storage sheds for a variety of items of various sizes and conditions. When used for camping, for example, the user can sleep, cook, sit, and eat in the RV, as well as store all the tools, toys, equipment, personal property, and accessories for the camping trip within the RV.

In general, it is desirable to design RVs for maximum flexibility, in terms of the uses to which it can be put. At the same time, it is desirable to design RVs for maximum capacity in any given use to which it is put. However, RVs are typically limited in size, as a matter of purchaser economics, drivability or towability limitations, fuel economy, and because of various governmental usage regulations. Thus, there are limited possibilities for both increased storage space and optimized floor plans when designing and constructing RVs.

Typically, an RV is constructed with interior living quarters having a variety of features therein, such as beds, kitchens, bathrooms, furniture, cabinets, tables. and counter tops. Storage areas are typically formed within the living quarters which can be accessed from inside of the RV. However, there are often certain types of items which, although commonly used with the RV when camping, for example, are best stored outside of or apart from the living quarters of the RV. Accordingly, many RVs are constructed with exterior storage compartments which are only or primarily accessible from the exterior of the RV.

Given that a single RV floor plan is a limited spacial area (especially in the horizontal plane), there are often tradeoffs which have to be made in creating the storage areas and living quarters features for that floor plan. For example, adding more interior storage areas and living quarters features can mean there is less space available for exterior storage areas. Previously, several methods have been used to offset or bypass such floor plan limitations.

For example, certain RVs have been constructed with greater vertical dimensions, such that "basement" storage areas can be formed under the living quarters. However, due to elevational features along roadways and the exterior environment, such as electric power lines, bridges, traffic lights, and trees, there are practical limitations to the vertical dimensions of an RV. In addition, increasing the height of an RV can substantially increase the cost of construction and maintenance of an RV, not just from the extra materials used in the wall structure, for example, but in the chassis reinforcing needed to support the extra weight. Also, increasing the RV height (and thereby the RV weight) can limit its towability and decrease fuel economy for the towing vehicle.

It has also been suggested that increasing RV versatility can be accomplished by designing RV living quarters features, such as beds, to be collapsible or fold up and out of the way, so as to clear away floor space, when greater storage space is needed. However, such designs then completely preclude the function of those features of the RV during the storage mode. Those proposed "solutions" become simply an either/or situation, or selection from usable aspects. In addition, when folded up, the features would often consume a portion of the interior storage or usable space or require special considerations from other interior features and/or structure. Further, folding up entire structures, such as bed frames, to get them out of the way, can be cumbersome and time-consuming, and/or require capacity for heavy lifting beyond that of typical RV users.

For example, a prior RV used a fold up, interior bed platform of a non-rectangular configuration to selectively increase vertical storage space, employed with a down-sized or smaller exteriorly accessible door, opening to only the area under the bed. This arrangement has advantages in manufacturing and maintenance costs, as well as floor plan placement versatility. However, the platform was folded up onto a wall mounted hinge, thus requiring structural support capability in that wall. Also, when fully raised, it was flush with a pre-existing wall. Thus, the entire bed sleeping function was precluded, and any horizontal projections from or mountings to that wall were precluded, and any windows or openings in that wall were fully obstructed, when extra storage space was needed. Further, any mattress used for that platform needed a separate storage area (or took up a portion of the storage area floor space where the bed had been) when the bed was folded up. Those limitations could significantly reduce the desirability or applicability of that fold up bed in certain situations. Further, the exterior opening door still limited the vertical accessibility to, and exterior entrance capacity of, the storage space when the bed was folded up. An example of this is shown in FIG. 1, from a model year 2017 Open Range UT2510BH RV.

To increase RV functionality and capacity for users, it has been previously suggested to employ bunk beds in RVs, bed frames having two vertically spaced bed platforms, upon which mattresses for sleeping are placed and supported. To increase floor space when the bunk beds are not being used for sleeping, it has been suggested that these platforms can be mounted on tracks which lift them vertically toward the RV ceiling and out of the necessary headroom for other uses. However, such arrangements typically add significant weight and/or expense compared to bunk beds used in static structures, like residential homes. Further, such arrangements do not facilitate decorative or aesthetically pleasing woodwork or other framing structure about the bed platforms, such as are often used in conventional residential bunk beds. In addition, such vertical lift bunk beds can limit or preclude the use of conventional safety guards against children inadvertently rolling out of the bunk beds. Thus, more expensive and cumbersome safety guards may be needed.

Also, when RV interior features, such as fold up or pull up beds are used to open up floor space for storage, they do not typically confine that space, or provide a separate enclosure of that space. As such, these fold-up features do not serve to separate items stored therein from the interior living space, or to separate exterior access/baggage doors from the interior living space, by a physical barrier.

Further, when bunk beds are used in an RV, accommodation typically needs to be made within the floor plan of the RV for a ladder, set of steps, or other means for providing convenient access to the top or upper bunk. Given the mobility of the RV, that ladder (or the like) should be readily securable against significant and various physical forces, not normally encountered by bunk bed ladders contemplated for use in static structures, and of sturdy construction. In addition, such ladders should be designed and configured to avoid taking up significant floor space when they are not being used.

In addition, improvements in RV design and manufacturing, as well as changes in the features employed within the RV living space, occur frequently. However, many prior RV floor plans are optimized for the particular time that RV was manufactured, but are not readily retrofittable to take full advantage of desirable features and advantages which have been developed since that time. Accordingly, users are occasionally required to choose between forgoing currently available features and advantages or purchasing an entirely new RV.

OBJECTIVES OF THE INVENTION

Accordingly, a primary objective of the present invention is to provide improved RV floor plan, having functional versatility, as well as enhanced functional capacity, concurrently. These improvements include providing products which:
   a. are inexpensive to manufacture, install, maintain, and repair,
   b. increase floor plan optimization when used in a vehicle, such as an RV,
   c. minimize component weight,
   d. increase storage area and accessibility thereto,
   e. increase supplemental feature accessibility and user comfort,
   f. balance the conflicting requirements of home, storage, and recreational functions of the applicable vehicle,
   g. increase the aesthetic appeal of RVs, and
   h. can be readily retrofittable into previously manufactured RVs.

SUMMARY OF THE INVENTION

These and other objectives of the present invention are achieved by the provision of a bunk bed apparatus, having at least upper and lower bunks, and which encloses a storage area under the lower bunk when the lower bunk is usable for sleeping, and encloses a larger storage area under the upper bunk when only the upper bunk is usable for sleeping, the lower bunk being moved to form an enclosing wall of the larger storage area. The apparatus can be disposed within a vehicle, such as an RV, adjacent a closable opening to the exterior of the vehicle, which gives full access to both sizes of the storage area. The apparatus can be formed with a slidable end wall which contains a pocket for receiving and storing an access ladder for the upper bunk, and that end wall can form a closable opening for the storage area.

Other objects, advantages, and novel features of the present invention will become more readily apparent from the following drawings and detailed description of certain preferred and alternative embodiments.

DETAILED DESCRIPTION OF THE DRAWINGS AND PREFERRED EMBODIMENTS

Figure 1:
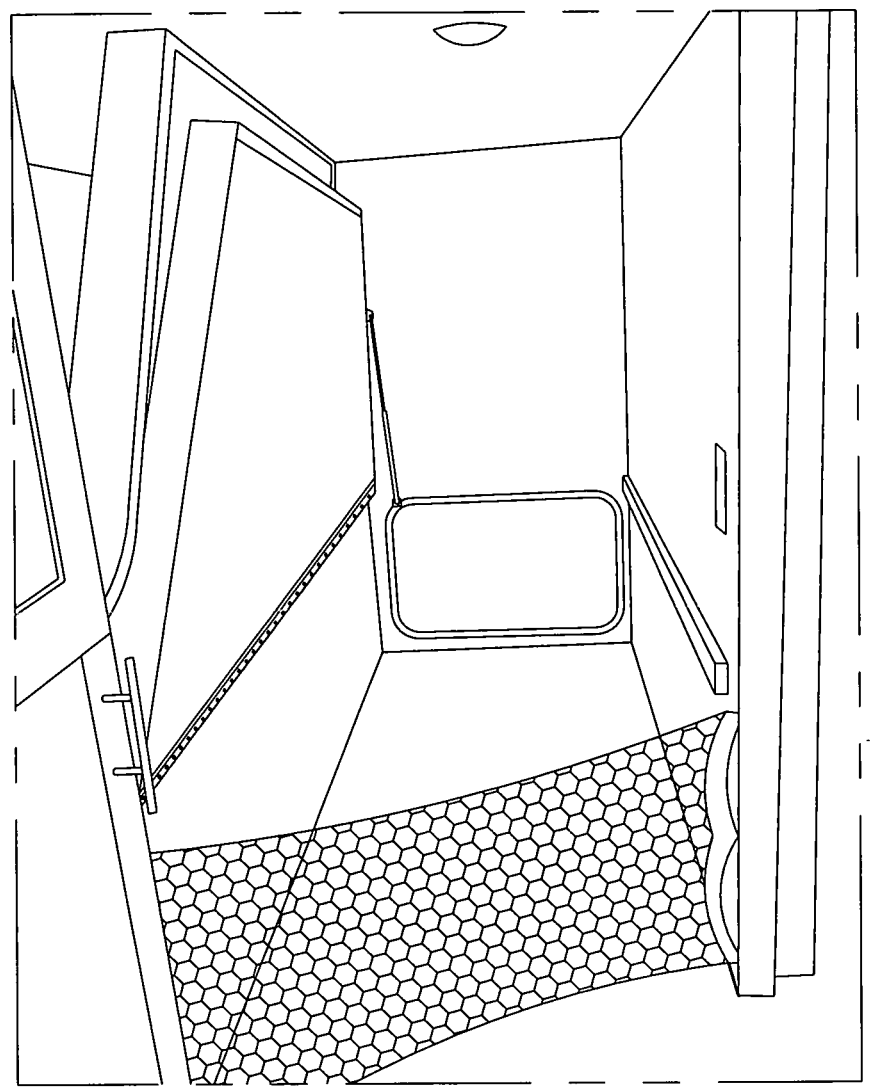
FIG. 1 shows a front view, of a prior art RV interior arrangement, from the inside of an RV, looking laterally across the width of the RV from the left side wall toward the right side wall, toward the opened baggage door, with the bed platform in a raised position.

The drawings show schematically, and in a best mode version, embodiments of the present invention as applied to a fifth-wheel trailer type of RV, both generically and specifically. However, the present invention is not limited in its embodiments to only such vehicles. The present invention can be readily used in other types of RVs, both towable and motorized, such as travel trailers, "toy haulers," and motorhomes. The present invention can also be readily used in static structures, including, for example, manufactured housing, as well as park model mobile homes, and "extended stay" trailers.

The drawings are not precisely to scale from one figure to the next. Dashed lines in the drawings indicate generic structural portions whose details not necessary for a full understanding of the present invention, as well as environmental structure and structure providing a frame of reference.

The following features are illustrated in the drawings by these numerals:

10 A housing structure or RV, having at least a:
11 Front wall,
12 Back wall
13 Interior back wall,
14 Left side wall,
16 Right side wall,
18 Floor,
19 Ceiling,
20 Door (opening to the exterior of the RV),
22 Bunk window, and
23 Side window,
24 Slide-out arrangement (a room portion movable between open positions where a portion projects laterally out of the RV, and closed positions where the exterior, end wall of the slide-out is substantially flush with the exterior of right side wall 16, preferably of conventional construction, except as indicated herein), containing an exterior, end wall and a side wall at each end thereof,
26 Couch, sofa, sleeper sofa, divan, cabinet, or other furniture,
28 Cabinet, closet, shelf, or other storage feature,
30 Bunk bed, disposed adjacent interior surface 13, having at least a:
32 Bunk bed frame,
32a Safety guard or anti-roll out rail,
33 Platform support ledge,
34 Upper bed platform,
36 Lower bed platform,
37 Support rail for lower bed platform, mounted, for example, to interior back wall 13
38 Upper bed mattress, and
39 Lower bed mattress,
40 Storage or baggage door,
41 Opening in left side wall 16 to the exterior of the RV, which can be covered by the baggage door, and which serves as an exterior "shed" or storage area opening,
42 Interior door fixture, which, for example, can be a latch released from the RV exterior and/or the RV interior, as desired by the user, or, alternatively (and as illustrated), can be a mounting for the lower arm of a conventional gas strut 43 used to prop open baggage door 40 if that door is hinged for upward motion away from opening 41,
43 Door strut, preferably of conventional gas strut construction, for releasably holding door 40 in a open position away from opening 41,
44 Framing for lower bed platform, preferably conventional in nature,
46 Platform strut, attached to the lower bed platform and the bunk bed frame to assist in raising and/or lowering the lower bed platform between horizontal and vertical positions, preferably conventional in nature, such as a gas strut construction,
48 Interior shed door opening, created when the ladder assembly is slid rearward and the lower bed platform is raised, giving access to the "shed" or storage area created within the bunk bed when the lower bed platform is raised to a vertical position,
50 Vertical height between floor 18 and defining the usable space under lower bed platform 36 when that platform is in a lowered, horizontal position,
51 Horizontal distance between interior back wall 13 and a forward portion of bunk bed frame 32, and defining usable space along the longitudinal length of the RV under lower bed platform 36 when that platform is in a lowered, horizontal position, 52 Hinge connecting lower bed platform 36 to frame 32, such as a surface mount "piano" hinge with a plurality of holes therein for attachment to the frame by conventional screw fasteners, 54 Releaseable latch means for retaining lower bed platform 36 in a raised or vertical position, such as a barrel slide bolt latch (See, for example, commercially available McMaster Carr P/N 1907A21), 56 Latch engaging means for receiving latch means 54, such as a striker plate mounted to a side edge of lower platform 36 and having a opening therein, 57 Aperture in lower bed platform, aligned with latch engaging means 56, for receiving and releasably retaining portion of latch means 54, 58 Ladder assembly, preferably mounted to frame 32 at an open end thereof, having at least a:

60 Ladder, having an upper end, and a lower end (selectively engagable with floor 18), 61 Side projection, preferably one on each side of ladder 60, in the upper portions of the ladder, and which, for example may be formed as an outward extension of the top rung of ladder 60, 62 Ladder frame surrounding ladder 60 and serving to retain the ladder therein (preferably as a pocket) when the ladder is not extended for use, 63 Interior slot, preferably one on each interior side of frame 62, dimensioned to closely receive side projection 61, and permit that projection to move vertically and pivot within the slot, the length and specific orientation of the slot being selected according the desired extension of the lower portion of ladder 60 outward from ladder assembly 58 for use, as well as the desired upward movement of ladder 60 to free it up for movement, out of the retaining recess within frame 62 described below, 64 Top roller means attached to frame 62 in order to permit sliding movement of frame 62, such as two spaced apart paired rollers, for example those which are part of commercially available McMaster Carr roller track kit P/N 1223A32, 66 Roller track, attached to bunk bed frame 32 to connected ladder frame 62 thereto through top roller means 64, such as the track of commercially available McMaster Carr roller track kit P/N 1223A32, 68 Lower door roller means, connected to frame 62 and engaging floor 18 so as to allow sliding movement of frame 62 along floor 18, such as a pair of spaced apart rollers of the type commercially available McMaster Carr P/N 1714A300, 69 Lower panel attached to frame 62 for defining a recess within frame 62 which is sufficient to engage a lower portion of ladder 60, and restrict movement of the ladder, preferably while keeping the lower portion of the ladder 60 close to (substantially at) the level of floor 18, 70 Back panel, connected to frame 62, preferably formed as or part of an end wall section for the bunk bed and a door member for opening 48, 71 Finished surface for the back or exterior exposed side of back panel 70, preferably finished so as to resist permeation of moisture and/or undesirable fumes from contents stored in the "shed" area, and present an aesthetically pleasing appearance when viewed from the RV exterior, and 71a Finished surface for the front or interior exposed side of back panel 70, preferably finished so as to conform aesthetically to the finish surface of bunk bed frame 32, and the finishes on surfaces 71 and 71a do not need to be the same, 72 Guide or surround for ladder assembly 58, attached at floor 18, such as between a corner of cabinet 28 and a corner post of bunk bed frame 32, so as to create an enclosed path for the ladder assembly to slide via the lower door roller means, 74 Finished surface for the underside of upper bed platform 34, upon which conventional light fixtures and/or storage containers or nets, or video and/or audio entertainment devices may be mounted, 76 Finished surface for the top side of lower bed platform 36, preferably to conform aesthetically to the finish surface of bunk bed frame 32, 78 Wall structure, extending forward from interior back wall 13, behind which the ladder assembly is slidable between positions to open and open and close opening 48, preferably finished on its surface, so as to resist permeation of moisture and/or undesirable fumes from contents stored in the "shed" area, and present an aesthetically pleasing appearance when viewed from the RV exterior, 80 Exterior access, releaseable latch means for retaining lower bed platform 36 in a raised or vertical position, connected to the framing for the lower bed portion and receiving structure adjacent 38 opening 41, either as an alternative to the arrangements of 54, 56, and 57, or as a supplement thereto, 82 Latch receiving bar, mounted adjacent to opening 41 on the interior of the RV, for use with latch means 80, and 84 Aperture in latch receiving bar 82, aligned with latch means 80, for receiving and releasably retaining portion of latch means 80.

The lateral width of the RV is defined as the distance between left side wall 14 and right side wall 16. The longitudinal length of the RV is defined as the distance between front all 11 and back wall 12 (and which may also include any towing hitch (not shown, but, for example, conventional in nature) projecting from front all 11 in certain preferred embodiments).

Figure 2:
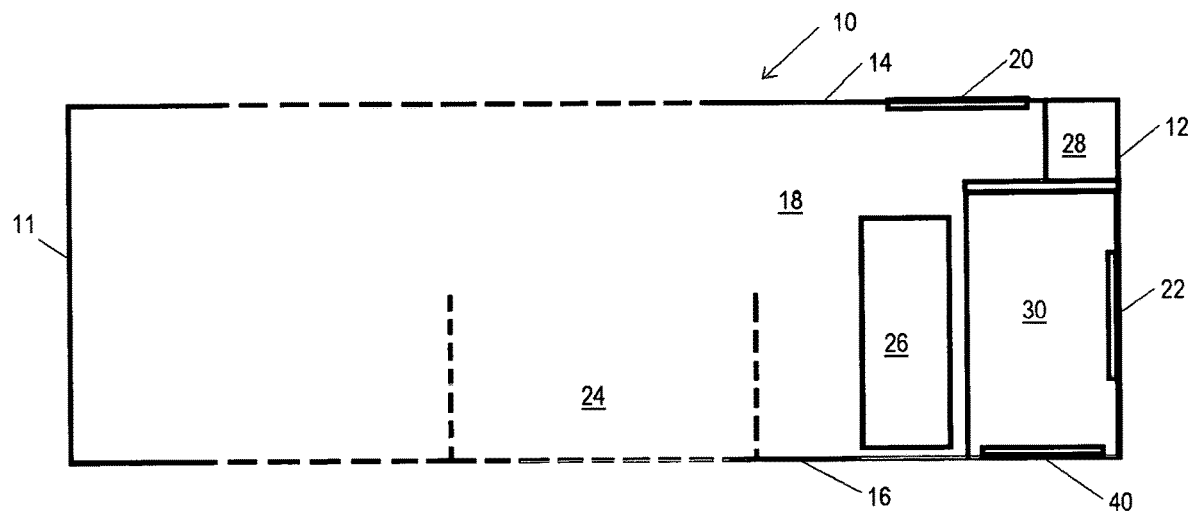
FIG. 2 shows a top plan view of a RV incorporating an embodiment of the present invention at the rear of the RV.
Figure 3:
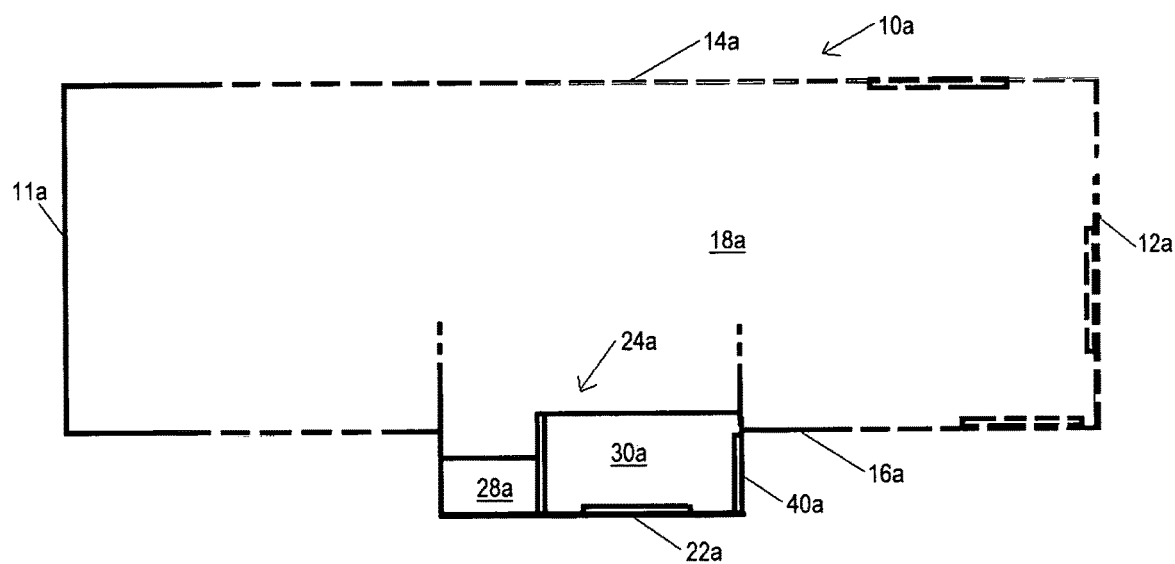
FIG. 3 is a top plan view of a RV incorporating an alternative embodiment of the present invention in the slide-out portion of the RV, with the bunk bed rotated 90 degrees with respect to the embodiment of FIG. 2.
Figure 4:
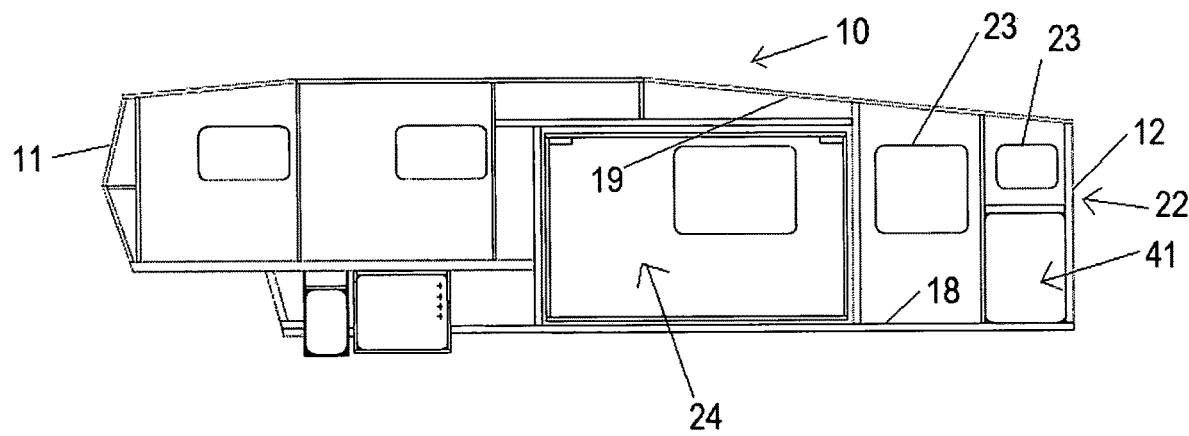
FIG. 4 is a right side of an RV incorporating an embodiment of the present invention, with the location of exemplary aluminum framing under a laminate wall shown along the side wall (that framing would be hidden from view in the finished product).
Figure 5:
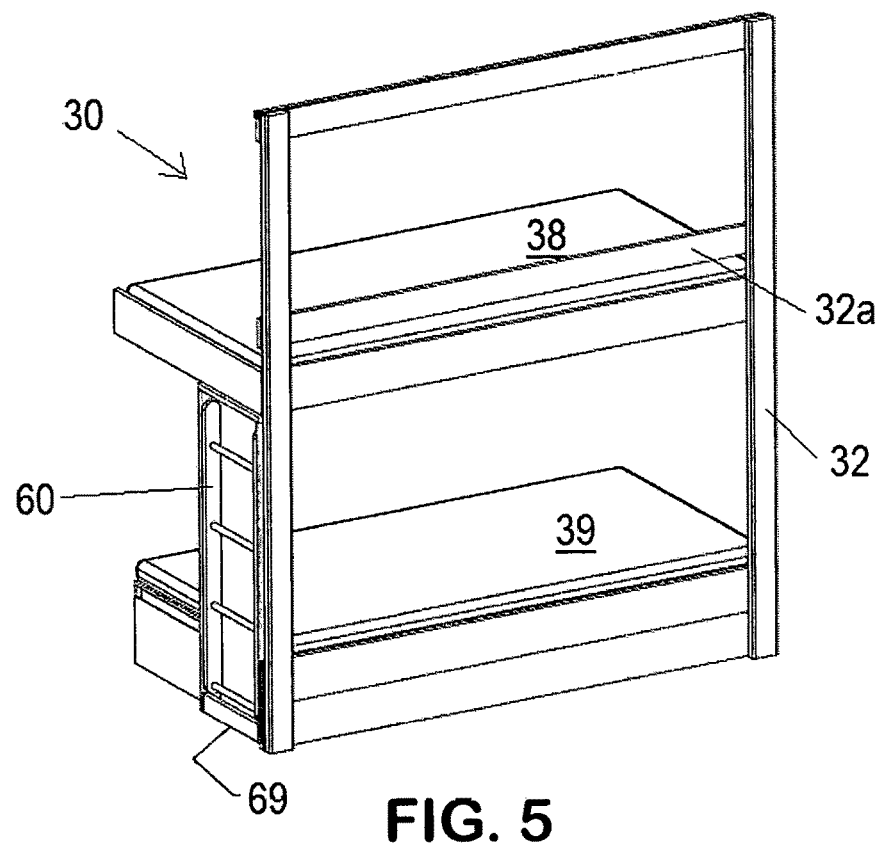
FIG. 5 is an upper, left, front perspective view of a bunk bed according to the present invention, with the rear portions of the framing removed for clarity.
Figure 6:
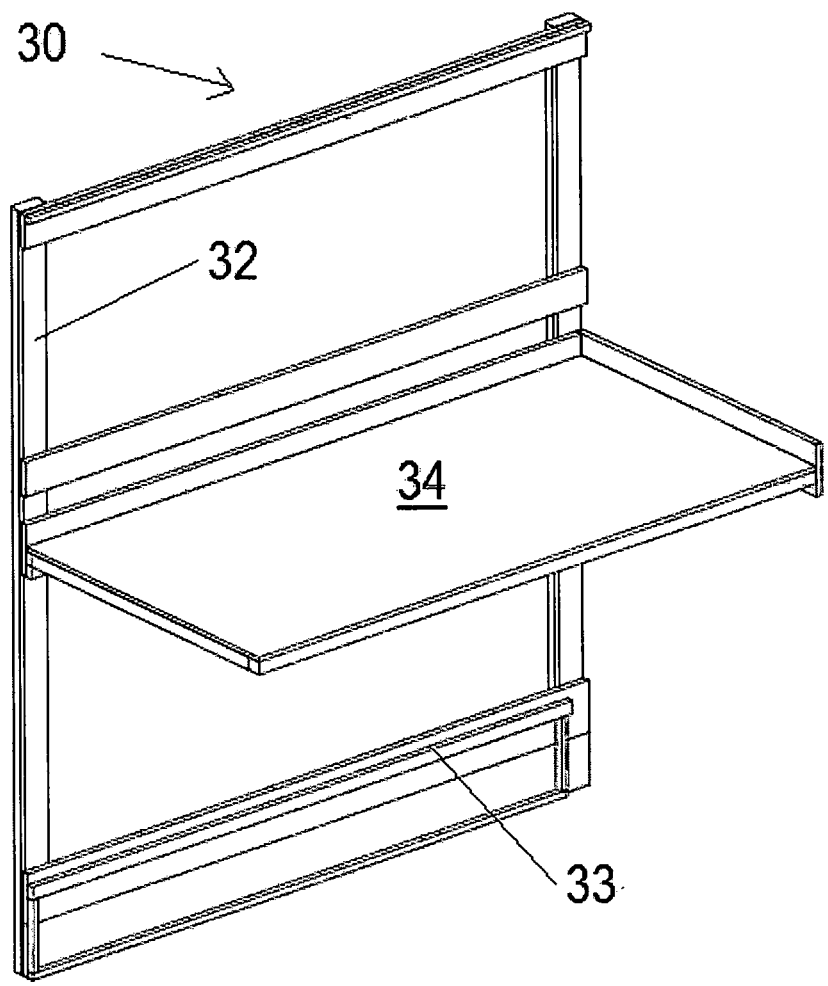
FIG. 6 is an upper, right, rear perspective view of the bunk bed of FIG. 5 with the mattresses and lower bed platform removed for clarity and the upper bed platform in a lowered or horizontal position.

In the alternative embodiment of FIG. 3, like components with respect to the components of FIG. 2 are denoted with the letter "a" following the component number, even though their orientation has been rotated 90 degrees with respect to the horizontal plane of the RV floorplan. More specifically, the exterior, end wall of slide-out portion 24a contains window 22a, and the two side walls of the slide-out portion contain door 40a and abut cabinet 28a, respectively. The interior of the end wall, with respect to RV 10a, forms an interior wall abutting bunk bed 30a.

As with prior bunk beds, when the bed mattress of the present are placed substantially horizontally on the corresponding bed platforms, the bunk bed can be used for sleeping and resting on those mattresses, with the bed platforms maintained in a given spaced vertical relation to each other. When one or more of the bed platforms is moved to a vertical position, the vertical bed platform of the present invention is not intended for sleeping or resting use, although a bed platform which remains horizontal at that time can still be used to support sleeping or resting.

In general, the present invention provides a means for integrating interior and exterior storage space within an isolatable "shed" which is accessible from the interior and/or the exterior of the housing structure. To accomplish this, the present invention teaches the use of a convertible bunk bed which can create a confined space of variable dimension (rather than an open space) with respect to other interior portions of the housing structure. The variable dimension of that confined space is determined, for example, by the extent to which the bunk bed is usable for sleeping or resting or other storage purposes.

For example, when both upper bed platform 34 and lower bed platform 36 are down, in a substantially horizontal position (such as when bed mattresses 38 and 39, respectively, and/or other items to be stored within the RV interior are placed on or supported by them), a first volume of storage area is created during that mode of use (substantially defined by the length of the bunk bed laterally across the RV, vertical height 50 and horizontal distance 51). That first volume is accessible from the exterior of the RV via door 40.

When lower bed mattress 39 is removed from lower bed platform 36 (and stored, for example, on upper bed mattress 38 or elsewhere), then lower bed platform 36 can be pivoted upward about hinge 52 to a vertical position, and thereby creating a second volume of storage area in that second mode of use (substantially defined by the length of the bunk bed laterally across the RV, the vertical distance between floor 18 and the underside of upper bed platform 34, and horizontal distance 51). The vertical orientation of lower bed platform 36 in that mode of operation/use restricts access to that storage area from the RV interior. In that mode and in embodiments of the present invention where the ladder assembly is not used, cabinet 28 can be formed to extend the horizontal distance 51 across the exposed end of bunk bed frame 32 to further restrict access to that storage area from the RV interior. Alternatively, such interior access restriction can be provided in other embodiments by a solid wall or panel across that exposed end of the bunk bed frame. Alternatively still, embodiments of the present invention can use the ladder assembly of the present invention, but without mounting the ladder frame to be slideable, in order to achieve similar restriction to access to that storage area from the RV interior.

The second volume of the storage area would, however, remain accessible from the exterior of the RV via door 40. Preferably, the vertical height of door 40 would closely correspond to the maximum vertical height of the storage area in each embodiment of the present invention, regardless of the mode of use in a particular instance. Other embodiments of the present invention can hinge door 40 from a side, to open forwardly or rearwardly with respect to the RV, instead of using the vertical opening arrangement of FIGS. 14-17. In addition, where the height of floor 18 above the exterior ground is sufficient to make it desirable to use an exterior ramp, step or ladder assembly to access the storage area from the vehicle exterior, that assembly can be mounted by conventional structure so as to fold up into the storage area during periods of non-use.

The second volume of storage area is preferably substantially larger than the first volume. For example, the first volume may be sufficient to store fishing poles, a volleyball net set, and/or various implements (shovels, racks, axes, etc.), while the second volume could contain items as tall as bicycles and motorized scooters.

Further, the present invention permits the use of conventional, removable trays (such as to collect mud, water, or the like from items placed therein) to be slid through door 40 and retained in place against excessive movement by the bunk bed frame. Preferably, these trays would have a vertical height less than vertical height 50, so that they can be stored in the "shed" during either mode of use of the present invention.

However, in especially preferred embodiments of the present invention, at least the storage area created in the second mode of use would also be accessible from the interior of the RV by use of the ladder assembly shown. Alternatively, an end wall assembly having slideable pocket door or hinged door could be used to provide such interior access, without incorporating a ladder therein. In embodiments where is was desirable to increase the width of opening 48, the dimensions of cabinet 28 can be reduced, or the cabinet omitted entirely.

To assist in moving lower bed platform 36 between horizontal and vertical orientations, conventional lift straps or knobs can be attached to (or pull holes can be disposed in) that platform, particularly when it is desired to be able to so move that platform from the interior of the RV without entering that storage area. In that regard, in certain embodiments, sofa or furniture 26 can be removable or slideable from its illustrated position, so as to also facilitate that platform movement.

Also, with the present invention, conventional window fixtures, such as shades or blinds, associated with window 22 do not project forwardly of sufficient distance as to interfere with the pivoting motion of lower bed platform 36. A compared to prior foldable bed platforms, the present invention pivots away from pre-existing walls to create its own storage wall, rather than rely upon pivoting toward and/or abutment with a pre-existing wall. Thus, operation or use of conventional wall mounted fixtures need not be affected by the present invention.

The present invention also contemplates a third mode of use, such as where a third volume of storage area is created by pivoting upper bed platform 34 (with its mattress removed) to a vertical orientation, in much the same way as is described above with respect to lower bed platform 36. The upper bed platform can, for example be retained in that vertical orientation by releaseable latches to ceiling 19 (or brackets mounted thereto) or to vertically extending corner posts or elements of bunk bed frame 32. In embodiments where the height of ceiling 19 above floor 18 would not otherwise allow a such simple pivoting motion of upper bed platform about a piano-type hinge connected to bunk bed frame 32, upper bed platform can be divided along its length (with each section being joined by another hinge) and permit "accordion" folding motion to a vertical position reaching to ceiling 19. In this way the third volume is defined by the length of the bunk bed laterally across the RV, the vertical distance between floor 18 and ceiling 19, and horizontal distance 51. In such embodiments, it can be advantageous to form door 40 with a taller height, and hinge it from a side. A sliding or rolled panel or any other convenient structure, secured, for example, to the bunk bed frame or to the upper portion of the ladder assembly, can be mounted on the exposed end of the bunk bed opposite door 40 to provide more complete enclosure for the shed in such third modes.

Further, where more that two stacked bunk beds are desired, the present invention can be readily adapted in similar fashion to provide even greater variation in the volume of space creatable for the shed and the number of modes of use, according to the number of bed platforms being pivoted toward a vertical orientation.

By using a convertible bunk bed assembly to define the shed, the present invention can be readily retrofit into existing RVs and other vehicles, particularly where a side wall already has been formed with a baggage door opening. Further, the present invention can be applied at multiple locations within an RV, as shown, for example, in FIG. 3, particularly where the bunk bed can be mounted directly to an existing interior wall surface, such as by support rail 37.

Similarly, and independently of the use of the bunk bed of the present invention, the ladder assembly can be retrofit for use with other existing types of bunk beds. In applications where closable access to the lower bed mattress is not needed, back panel 70 can be omitted. In applications were such closeable access is desired, a hand slot, strap, handle or knob can be provided on panel 70 to allow lower bunk users to control lateral sliding of the ladder frame. The height of ladder 60 can be selected as desired in a given application, both for bunk bed use, and to assist in access to nearby cabinets and other interior features. In applications were ladder assembly is 58 is desired without an adjacent cabinet and/or bunk bed, the ladder assembly can be mounted into an adjacent wall, shroud, cabinet, or other interior furnishing.

Figure 7:
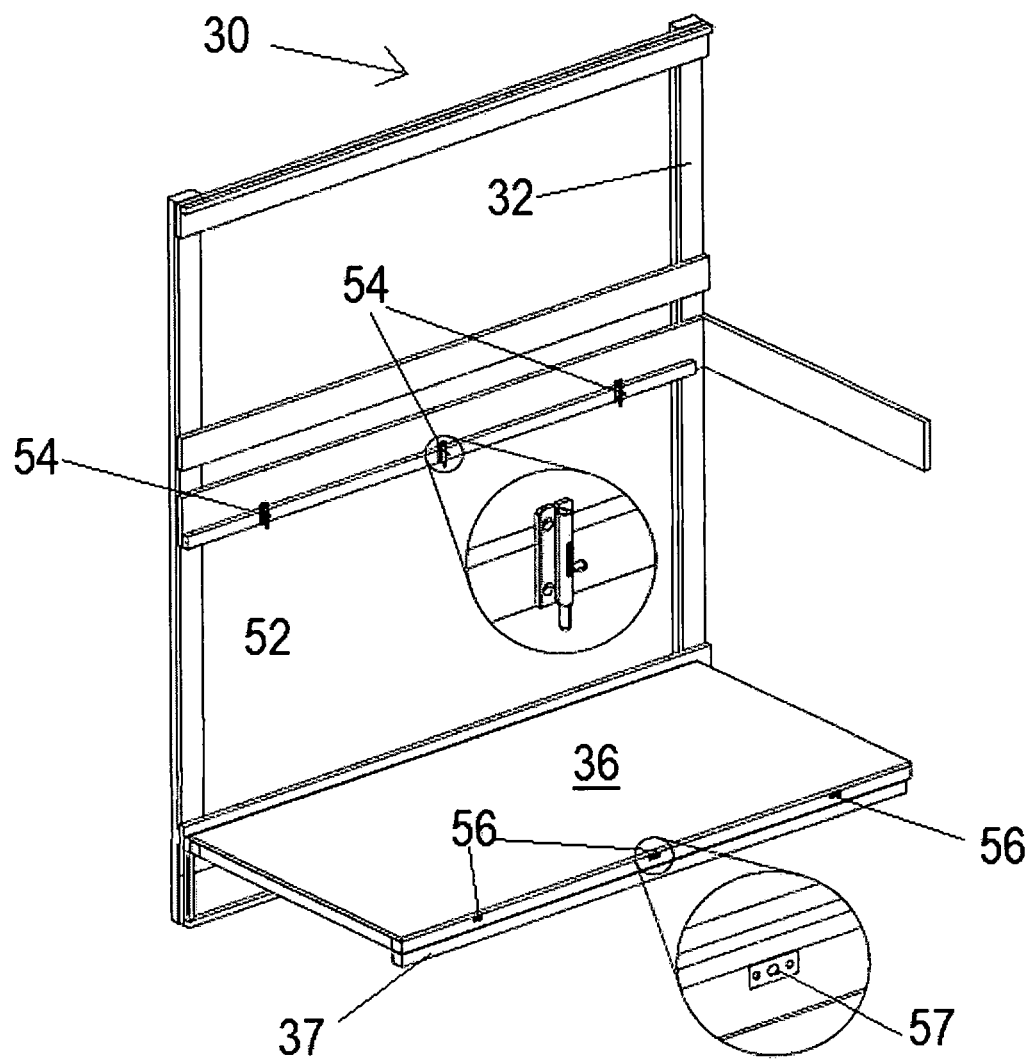
FIG. 7 is an upper, right, rear perspective view of the bunk bed of FIG. 5, with the mattresses and upper bed platform removed for clarity and "zoom out," enlarged latch feature illustrations included for clarity, and the lower bed platform in a lowered or horizontal position.
Figure 8:
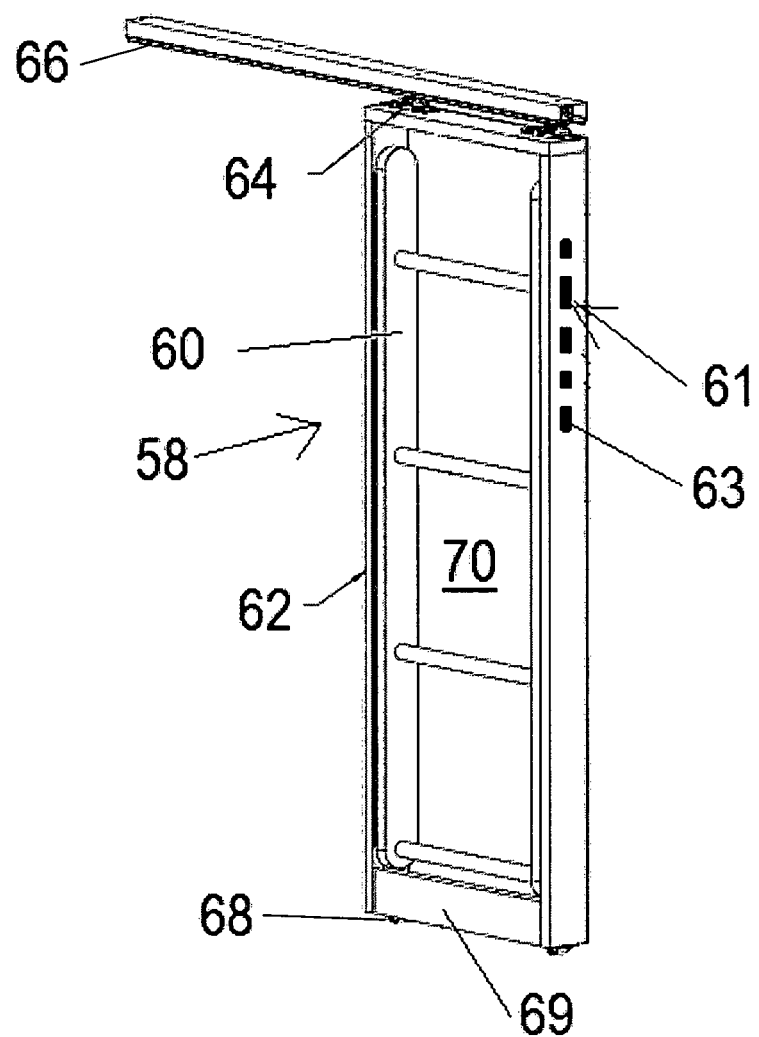
FIG. 8 is an upper, left, front perspective view of the ladder assembly, as removed from an end of the bunk bed frame and with the ladder in a non-extended position within the ladder frame (such as for storage or non-use or use with limited rung access).
Figure 9:
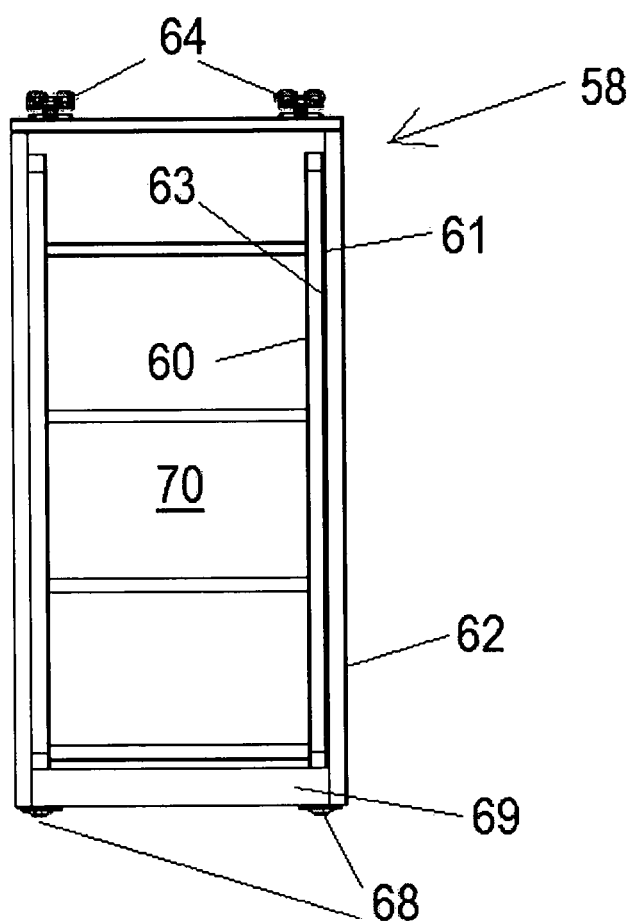
FIG. 9 is a left view (looking from the left side wall of the RV toward the right side wall of the RV) of the ladder assembly of FIG. 8, with the roller track removed for clarity, and the ladder in the non-extended position of FIG. 8.
Figure 10:
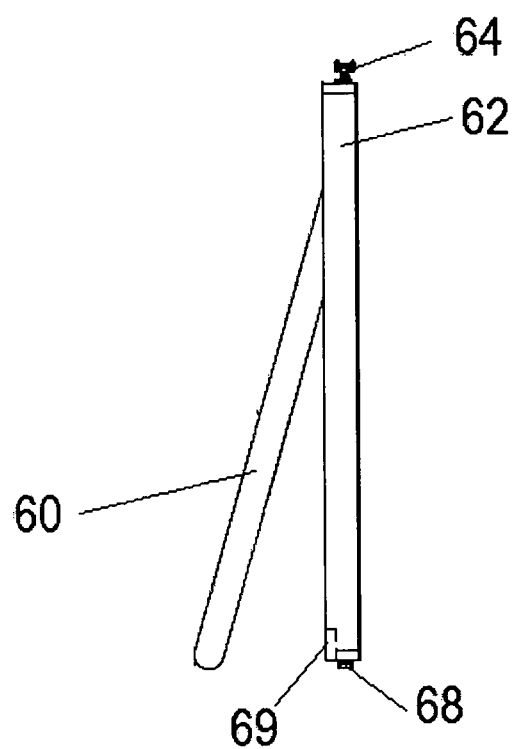
FIG. 10 is a front view (looking from a position forward of back wall 12 toward back wall 12) of the portion of the ladder assembly shown in FIG. 9, excepting that the ladder is in a extended position, moved laterally outward from the ladder frame toward left side wall 14, such as for use to climb the rungs to the upper bed mattress (with greater rung access).
Figure 11:
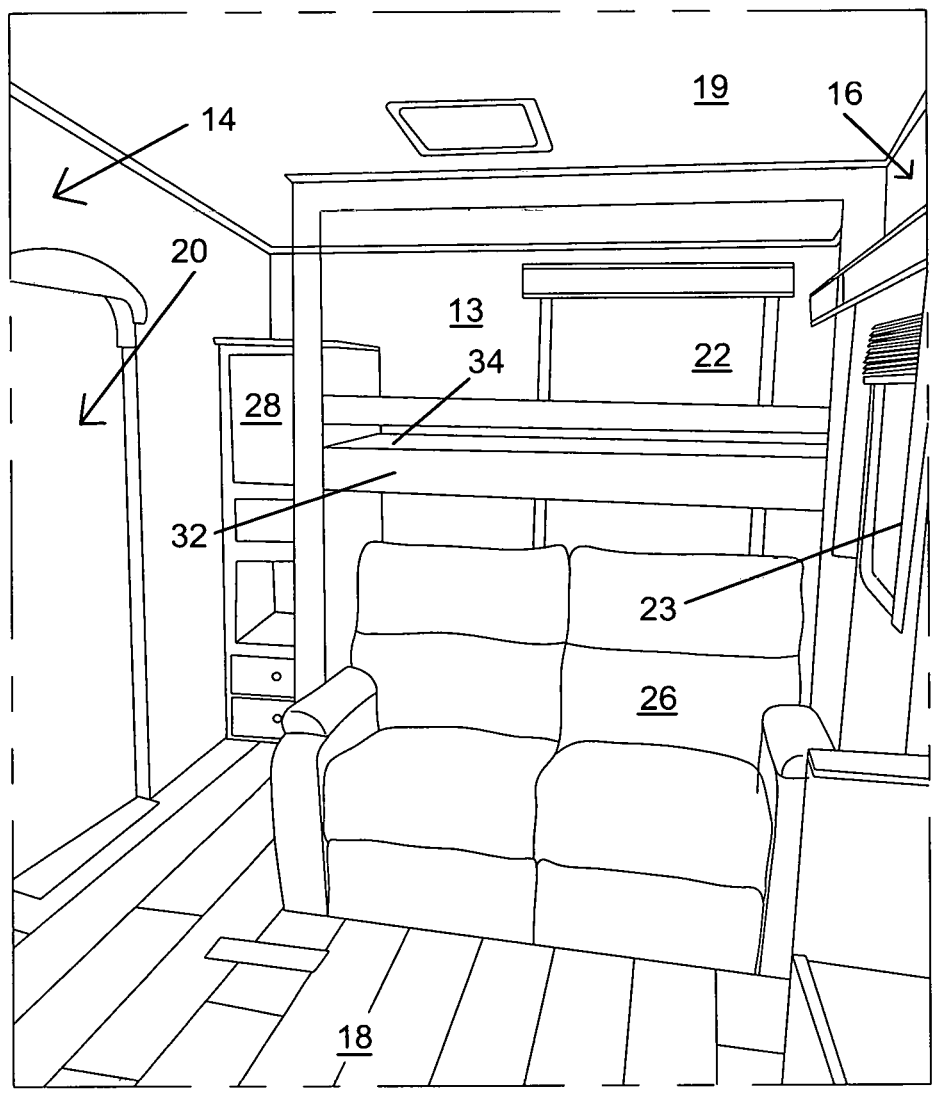
FIG. 11 is a front view (looking from a position forward of back wall 12 toward back wall 12) of a portion of the interior of an RV incorporating a preferred embodiment of the present invention therein, with door 20 open to the exterior of the RV.
Figure 12:
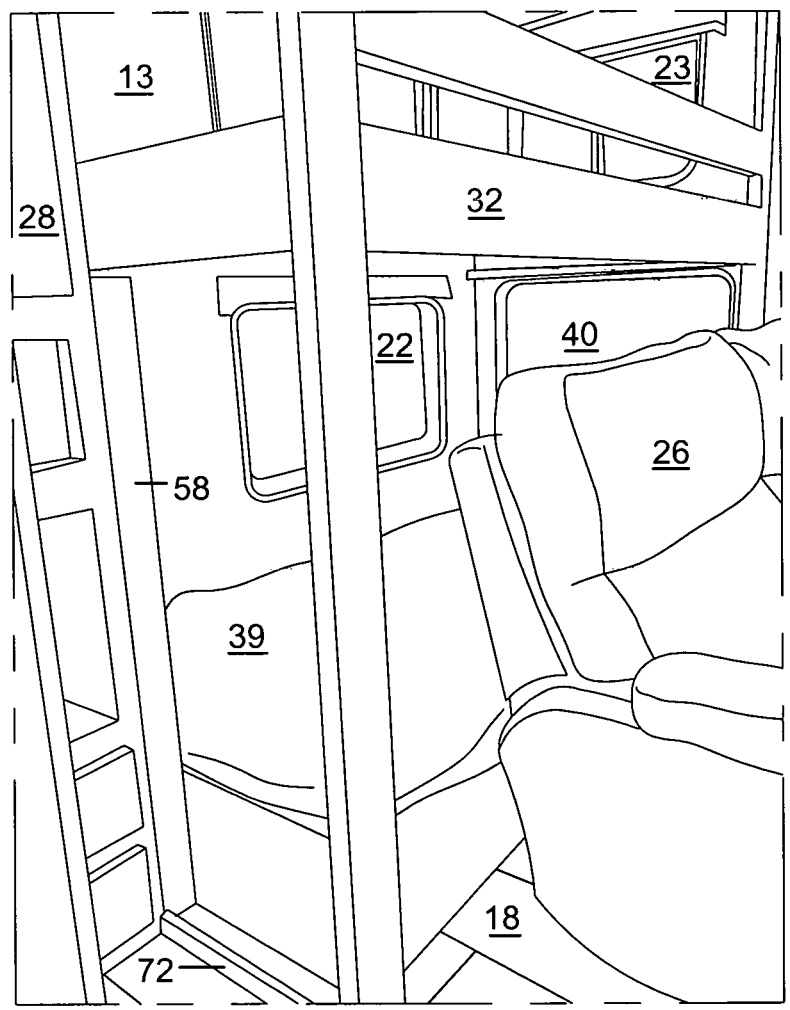
FIG. 12 is a left side, rearward perspective view of a portion of the embodiment of FIG. 11, with the ladder assembly slid to the rear, beside cabinet 28, so as to open access to the lower bed mattress of the bunk bed, with the lower mattress shown in protective plastic wrap for shipping.
Figure 13:
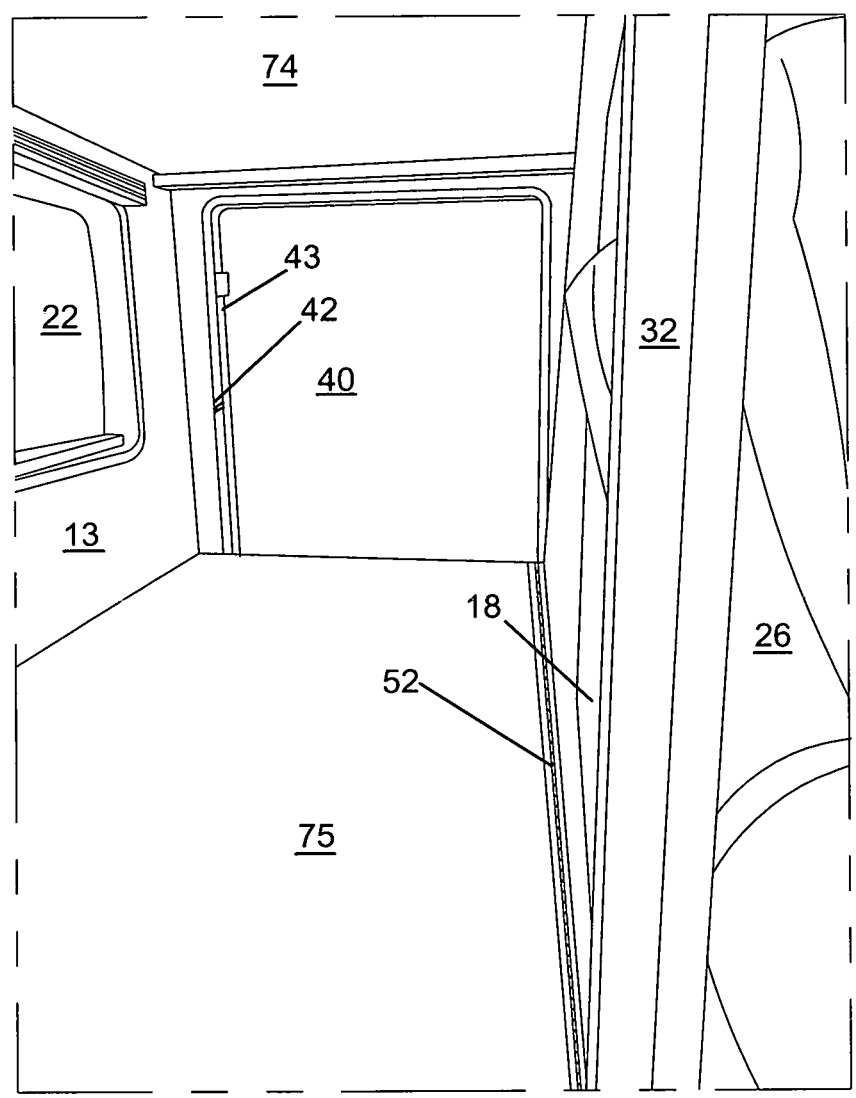
FIG. 13 is a left side, rearward perspective view of a portion of the embodiment of FIG. 12, with the lower bed mattress removed, the lower bed platform in a lowered, generally horizontal position, and the ladder assembly slid to the rear so as to open access to the lower bed platform of the bunk bed.
Figure 14:
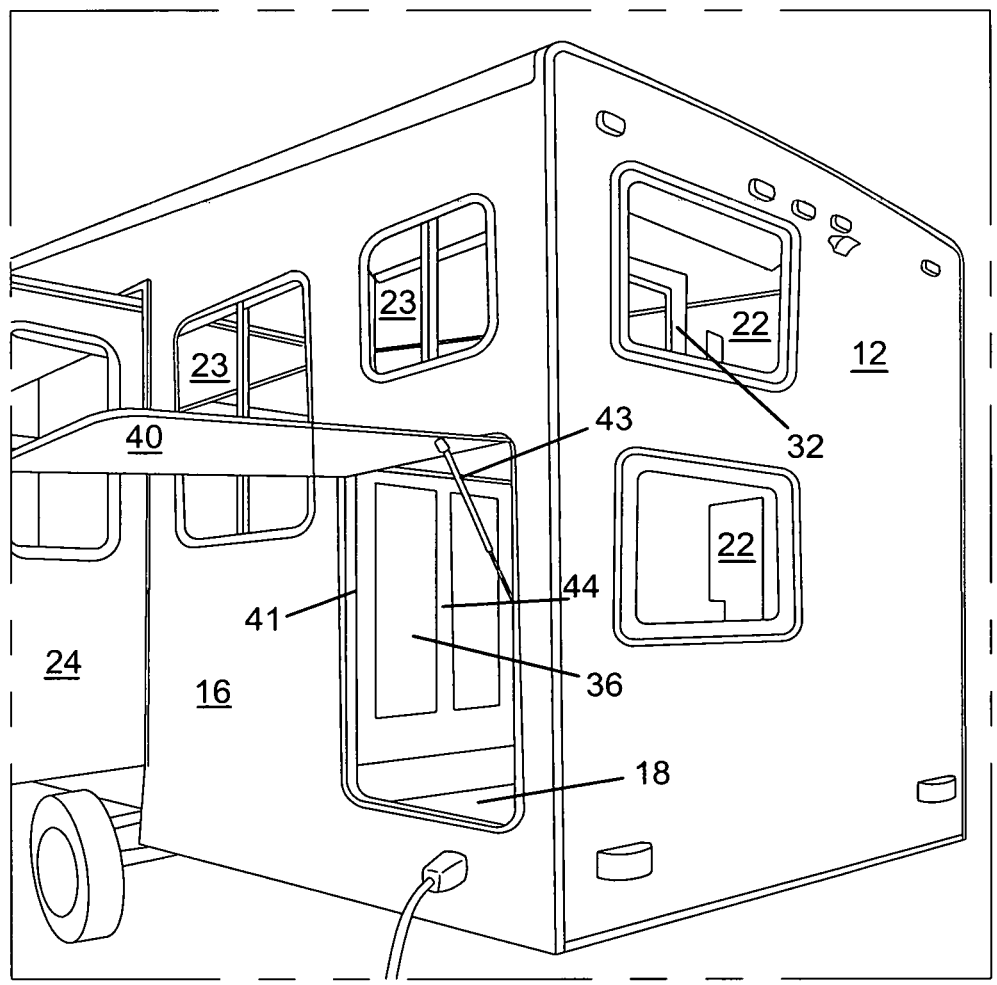
FIG. 14 is a right side, forward perspective exterior view of a portion of the RV of FIG. 11, with the baggage door open and supported by the door strut, the lower bed platform raised to a vertical position (showing the unfinished surface of its underside and the framing therefor), the ladder assembly slid to the rear, and the slide-out arrangement opened to project laterally out of the RV.
Figure 15:
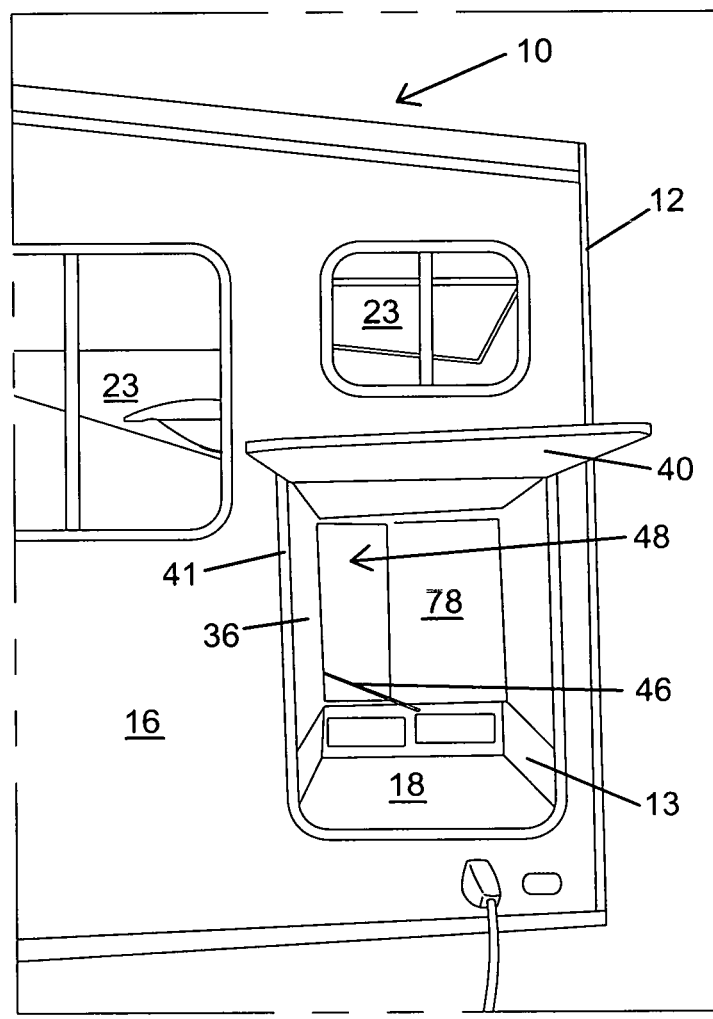
FIG. 15 is a right side, exterior view of a portion of the RV of FIG. 14, in the same orientation of elements as that figure.
Figure 16:
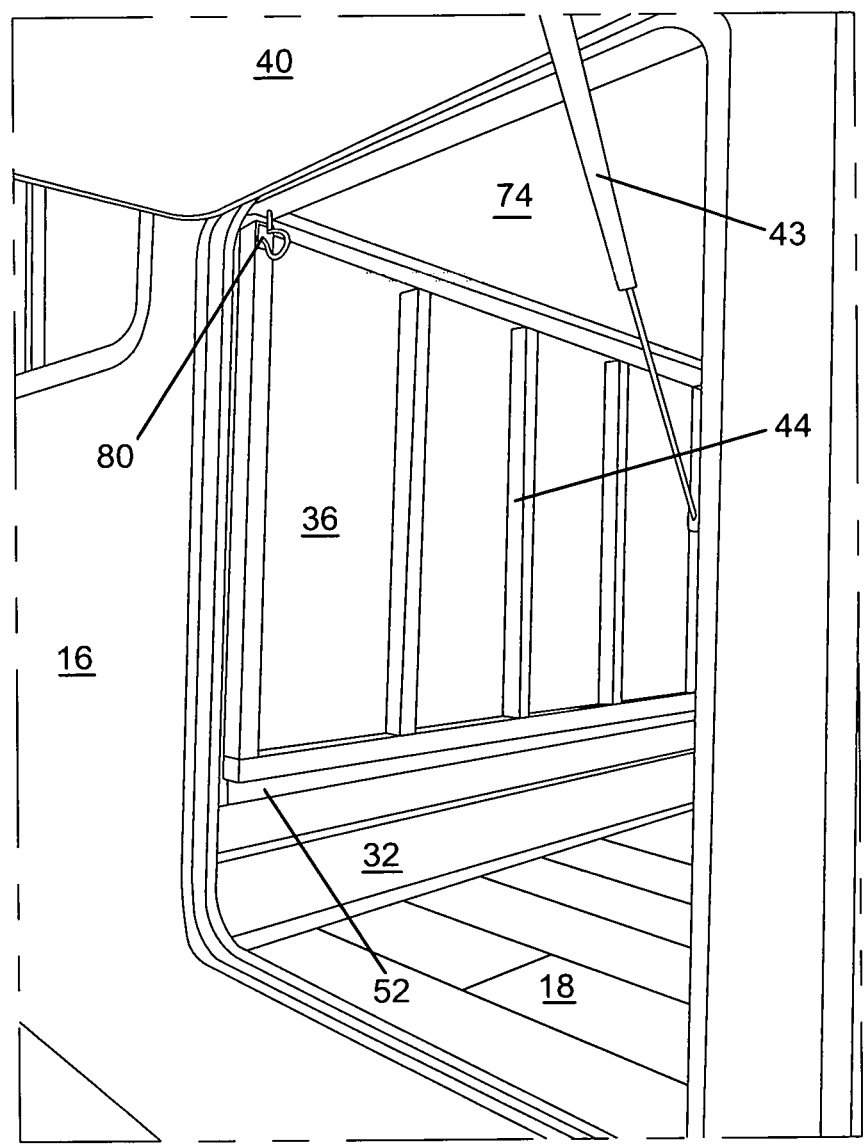
FIG. 16 is an enlarged, right side, forward perspective exterior view of a portion of the RV of FIG. 14, in the same orientation of elements as in that figure.
Figure 17:
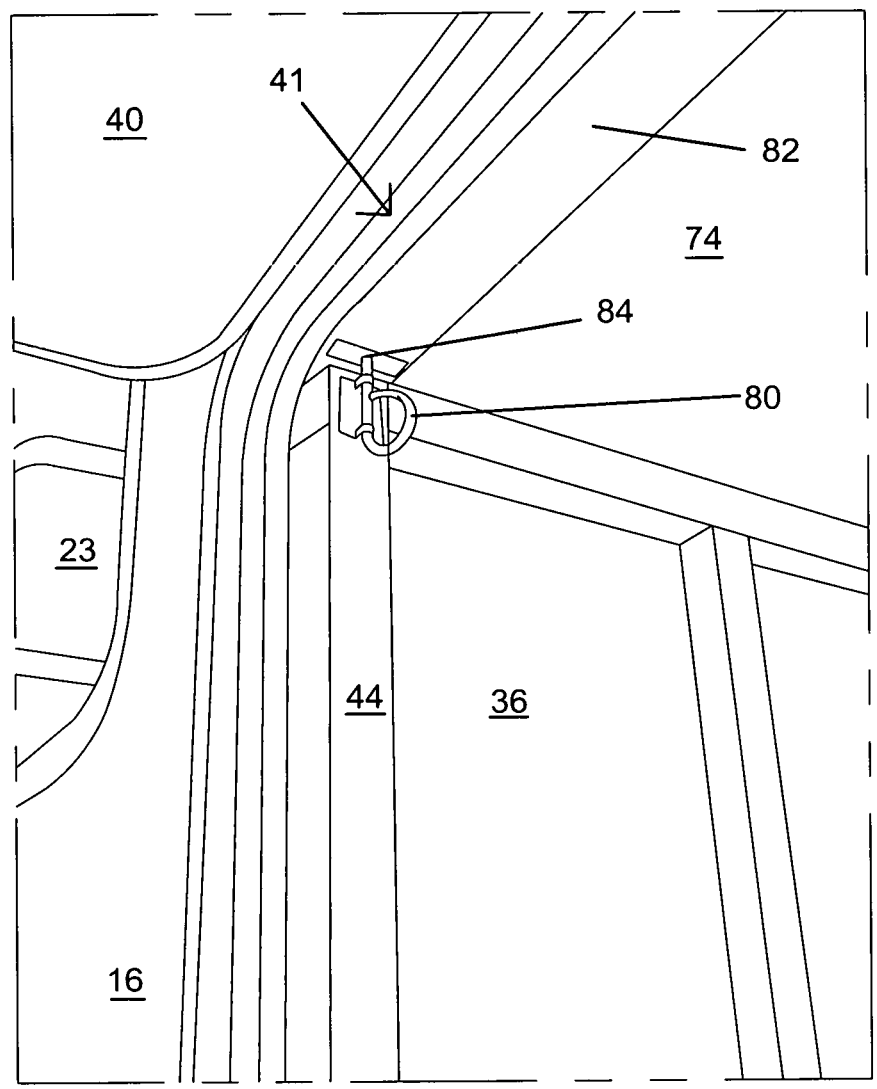
FIG. 17 is a further enlarged, right side, forward, lower perspective exterior view of a portion of the RV of FIG. 14, in the same orientation of elements as in that figure.
Figure 18:
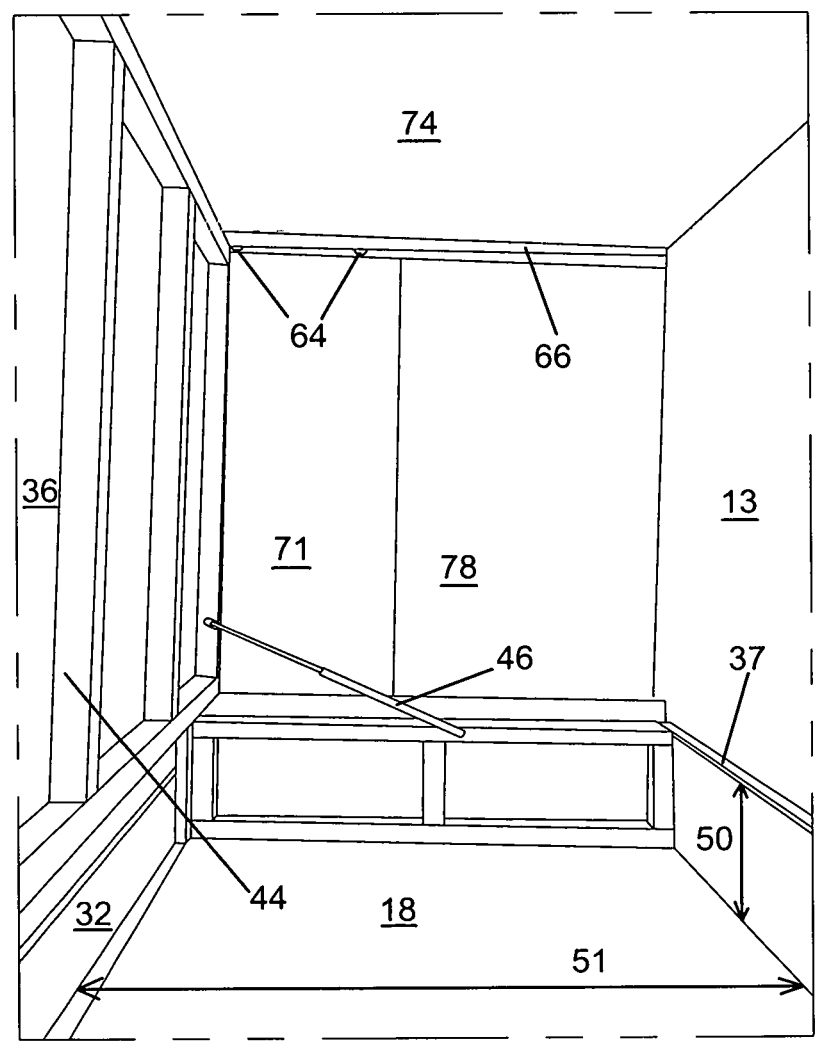
FIG. 18 is an enlarged, right side view of a portion of the RV of FIG. 14, in the same orientation of elements as in that figure, except that the ladder assembly is moved forward, toward front wall 11, so as to close opening 48.
Figure 19:
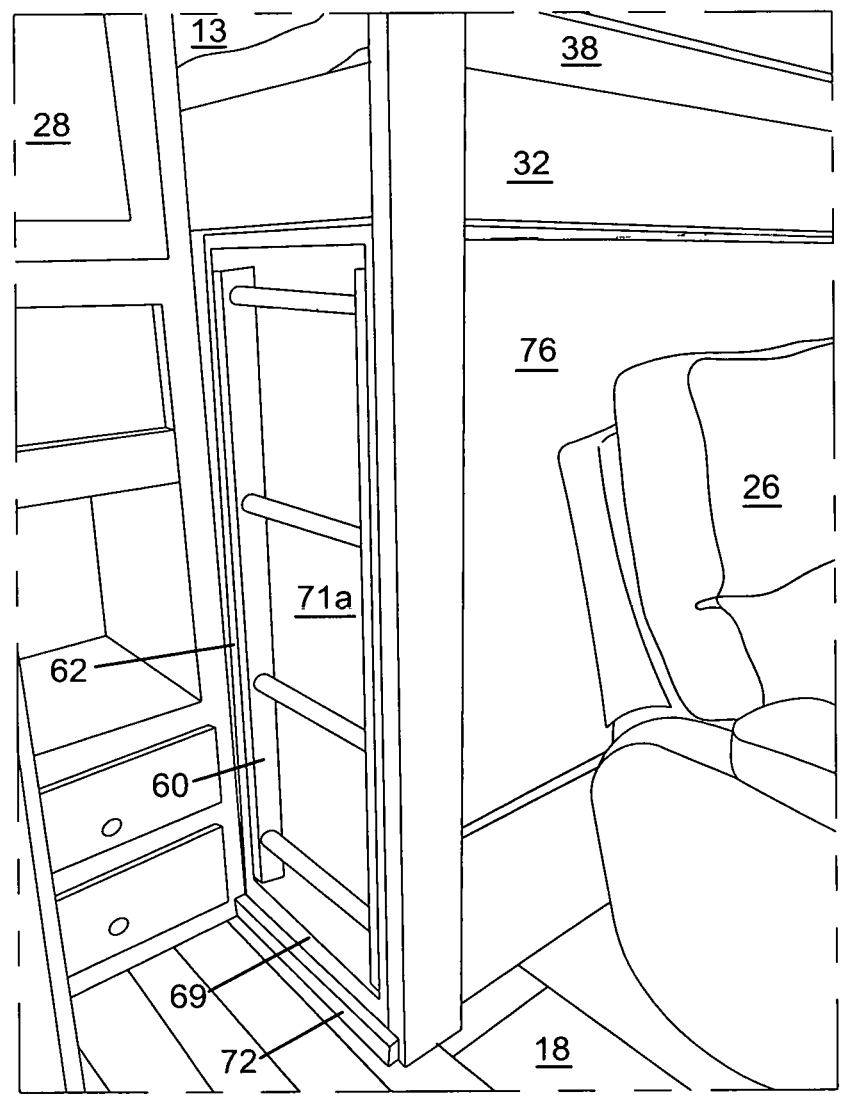
FIG. 19 is a left side, rearward perspective view of a portion of the embodiment of FIG. 11, with the ladder assembly slid forward, beside cabinet 28, so as to completely close opening 48 and close access to the "shed" or storage area created within the bunk bed when lower bed mattress is removed and the lower bed platform is raised to a vertical position, and when the ladder is in a non-extended position within the ladder frame, and with the upper bed mattress shown in protective plastic wrap for shipping.
Figure 20:
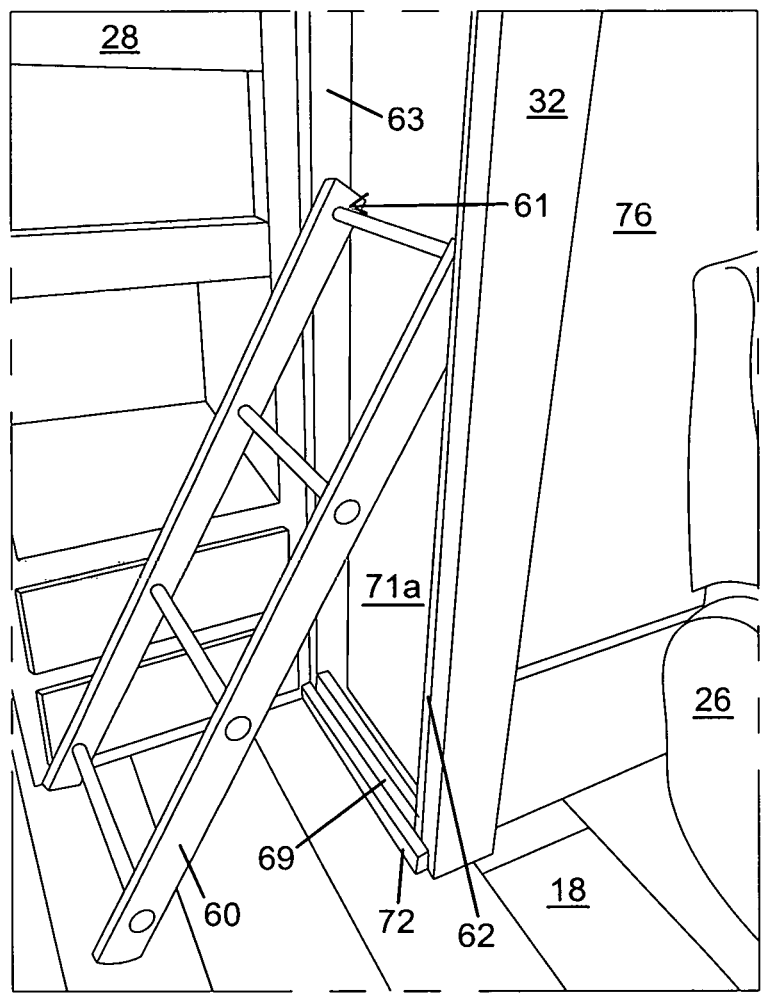
FIG. 20 is a left side, rearward perspective view of a portion of the embodiment of FIG. 11, with the same orientation of the elements as in FIG. 19, except that the ladder is in a extended position, moved laterally outward from the ladder frame toward left side wall 14, such as for use to climb the rungs to the upper bed mattress.
Figure 21:
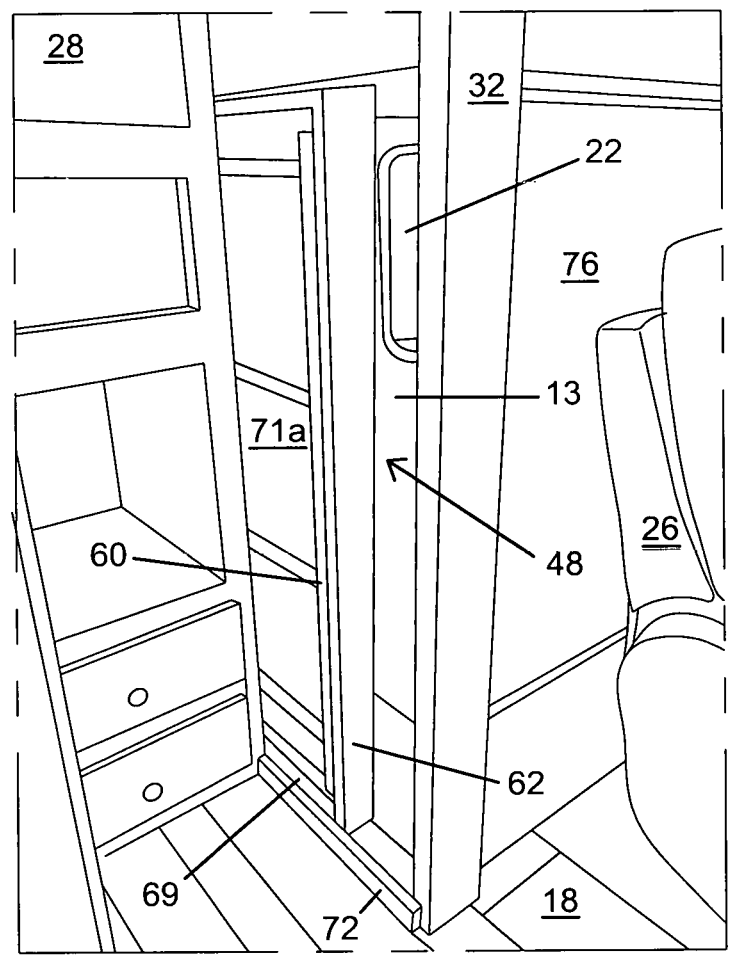
FIG. 21 is a left side, rearward perspective view of a portion of the embodiment of FIG. 11, with the same orientation of the elements as in FIG. 19, except that the ladder assembly is slid rearward, beside cabinet 28, so as to partially open access to the "shed" or storage area, and create opening 48 to a partial extent, less than its full potential width.
Figure 22:
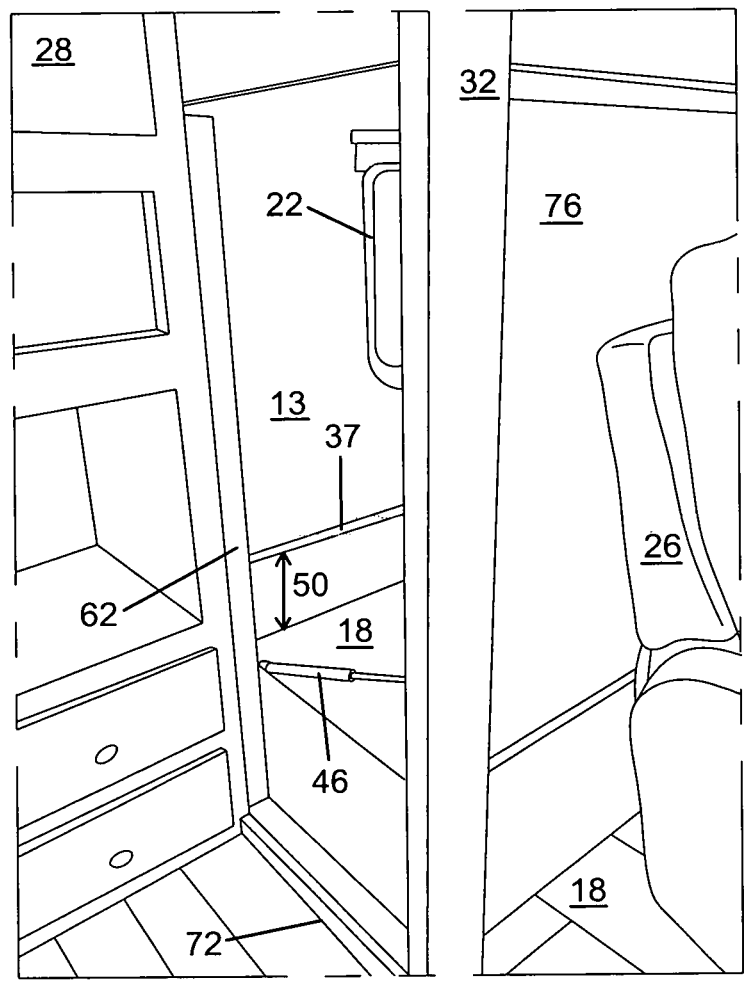
FIG. 22 is a left side, rearward perspective view of a portion of the embodiment of FIG. 11, with the same orientation of the elements as in FIG. 19, except that the ladder assembly is slid rearward, beside cabinet 28, so as to completely open access to the "shed" or storage area, and create opening 48 to its full extent, according to the dimensions of cabinet 28 and/or the placement of that cabinet within the RV.

FIG. 7 illustrates and embodiment where latch means 54 is actuatable from within the shed. However, various conventional alternative latch assemblies can be used which are actuatable from both within the shed and within the RV interior, as desired in a given application.

Further, lower bed platform 36 and panel 70 can be provided with conventional sealing edges, so as to provide a vapor barrier for the shed. In that way, items which have undesirable fumes can be stored in the shed without significant adverse impact on users of the RV interior. Similarly, a conventional dehumidifier, ozone cleaner or the like can be operated within the shed without impacting any other area of the RV.

To facilitate organization of and accessibility to items stored within the shed, various conventional tie down loops, pouches, nets, and containers can be mounted to the underside of lower bed platform 36 and/or framing 44. Also, lighting and electrical power fixtures can be mounted to wall structure 78 and/or interior back wall 13 to allow use when lower bed platform 36 is in horizontal and/or vertical orientations, at locations which do not restrict pivoting motion of lower bed platform 36.

In general, door 40 can include any desired conventional selective locking mechanism. However, in certain embodiments, door 40 can provide a supplemental fire escape or emergency exit, such as if an interiorly operable latch is utilized for opening that door, although connection of that latch to an automatic fire alarm may be advisable, especially where the bunk bed is expected for use by children. In those applications, a slideable fire ladder or step assembly can be stored adjacent door 40 in the first volume of storage area for immediate access.

Although the present invention has been shown and described herein with respect to certain preferred embodiments and alternative configurations, those were by way of illustration and example only. For example, in FIG. 1, interior wall 13 is at the back of the RV, adjacent back wall 12. However, in other embodiments, another room can be formed between interior wall 13 and back wall 12. In such embodiments, interior wall 13 would preferably be formed as an interior wall extending generally orthogonal to side walls 14 and 16.

Also, FIG. 3 illustrates that in slide-out applications, the bunk bed of the present invention can be rotated 90 degrees with respect to the embodiment of FIG. 2. However, in other slide-out applications the bunk bed of the present invention can maintain the same orientation as in FIG. 2, particularly when one of the side walls of the slide-out structure (such as that containing door 40a shown in FIG. 3) forms interior wall of sufficient lateral span to cover the length of the bunk bed. Another alternative embodiment of the present invention with respect to slide-out applications would be switch the locations of window 22a and door 40a from that positions shown in FIG. 3, and/or to include a window in 40a at that switched location in the exterior, end wall of the slide-out portion.

Accordingly, the spirit and scope of the present invention is intended to be limited only by the terms of the appended claims.

What is claimed is:

1. An apparatus comprising:
   a bunk bed for sleeping, disposed within a housing structure, and
   a storage area, disposed within at least a portion of the bunk bed, accessible from the exterior of the housing structure,
wherein:
   the bunk bed includes a lower bed platform and an upper bed platform,
   the bunk bed includes a frame for supporting the platforms within the housing structure and maintaining the platforms in vertically spaced relation,
   the lower bed platform is movably connected to the frame, between a generally horizontal position which supports sleeping, and a generally vertical position wherein the platform does not support sleeping,
   that vertical position of the lower bed platform provides greater space for the storage area, as compared to the space of the storage area when the lower bed platform is in a generally horizontal position,
   the housing structure is formed within a vehicle,
   the vehicle includes an exterior wall separating the interior of the vehicle from the exterior environment,
   the exterior wall includes a selectively closable opening therein which permits passage from the exterior environment to the interior of the vehicle,
   the bunk bed is disposed adjacent to the closable opening, such that the closable opening provides access to the storage area,
   the vehicle includes an interior wall adjacent the closable opening and extending generally orthogonal to the exterior wall,
   the bunk bed is rectangular and has a longitudinal length and a lateral width,
   the bunk bed is disposed such that the interior wall is adjacent a first side of the bunk bed which extends along the longitudinal length, and the closable opening is adjacent a second side of the bunk bed which extends along the lateral width,
   the lower bed platform is connected to the frame such that when it is in the vertical position it is spaced apart from the first side of the bunk bed by substantially the lateral width, and the storage area in that vertical orientation of the lower bed platform is defined as the space between the lower bed platform and the interior wall,
   the bunk bed includes an end wall section, disposed at the opposite side of the bunk bed from the second side, and
   the end wall section is slidably mounted with respect to the bunk bed, such that it is movable along the lateral width of the bunk bed and can restrict access into the storage area from that opposite side of the bunk bed.

2. The apparatus according to claim 1 wherein:
   a ladder, having an upper end and a lower end, is pivotally with respect to the end wall section, and movable between a first ladder position (where its lower end is adjacent the end wall section), and a second ladder position (where is lower end is spaced apart from the end wall section).

3. The apparatus according to claim 2 wherein:
the ladder is slidably mounted with respect to the end wall section,
such that the lower end of the ladder is at substantially the same vertical position regardless of whether the ladder is in the first ladder position or the ladder second position.

4. A recreational vehicle, having an interior space separated from the exterior environment, comprising:
an exterior wall exposed to said exterior environment,
an interior wall surface disposed substantially orthogonal to said exterior wall, within said interior space,
an opening in the exterior wall which allows access to said interior space from said exterior environment,
a bunk bed disposed adjacent to said opening within said interior space,
  said bunk bed having an upper bed platform and a lower bed platform, each of which being formed to receive and support a removable mattress thereon when the platforms are in a sleeping orientation,
  said bunk bed forming a storage space with access to that storage space from said exterior environment provided through said opening,
  said lower bed platform is movably connected to said bunk bed so as to be selectively oriented in a first platform position (defining a sleeping orientation) and a second platform position (defining an enhanced storage orientation), and
  said lower bed platform is disposed to limit access to said storage space from said interior space when said lower bed platform is in said second platform position, wherein:
  said interior space includes a floor,
  said bunk bed is disposed on said floor
  said storage area is formed to have:
    a first volume, when said lower bed platform is in said first platform position, defined by the space within said bunk bed which is between the underside of said lower bed platform and said floor,
    a second volume, when said lower bed platform is in said second platform position, defined by the space between within the bunk bed which is between the underside of said upper bed platform and said floor
  said interior space includes a ceiling,
  said bunk bed is disposed beneath said ceiling,
  said upper bed platform is movably connected to said bunk bed so as to be selectively oriented in a first platform position (defining a sleeping orientation) and a second platform position (defining a further enhanced storage orientation),
  said upper bed platform is disposed to limit access to said storage space from said interior space when said upper bed platform is in said second platform position, and
  said storage area is formed to have a third volume, when said lower bed platform and said upper bed platform are both in their respective second platform positions, defined by the space between within the bunk bed which is between said ceiling and said floor.

* * * * *